H. A. PRINDLE.
CENTRIFUGAL PUMP.
APPLICATION FILED AUG. 6, 1907.
958,765.
Patented May 24, 1910.
5 SHEETS—SHEET 1.
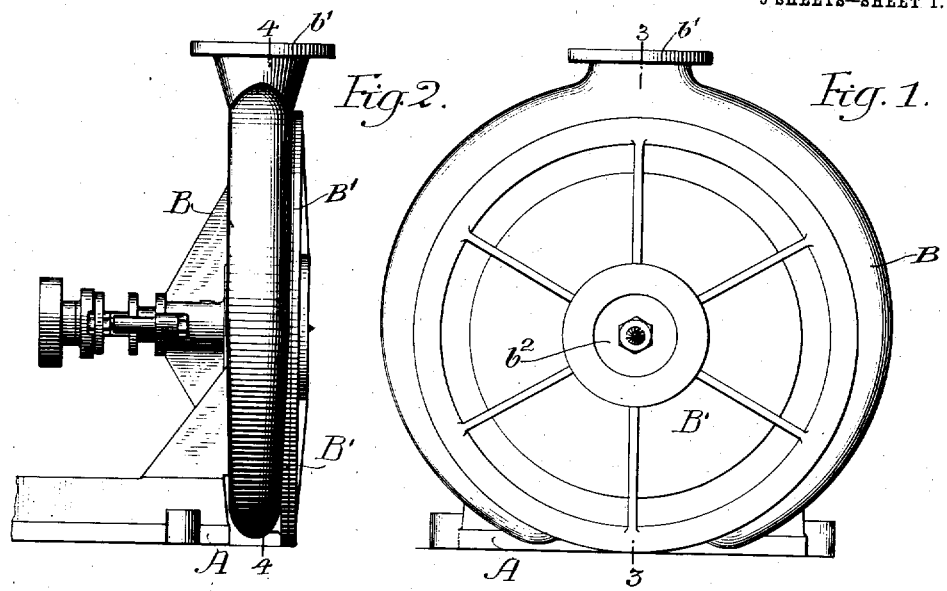
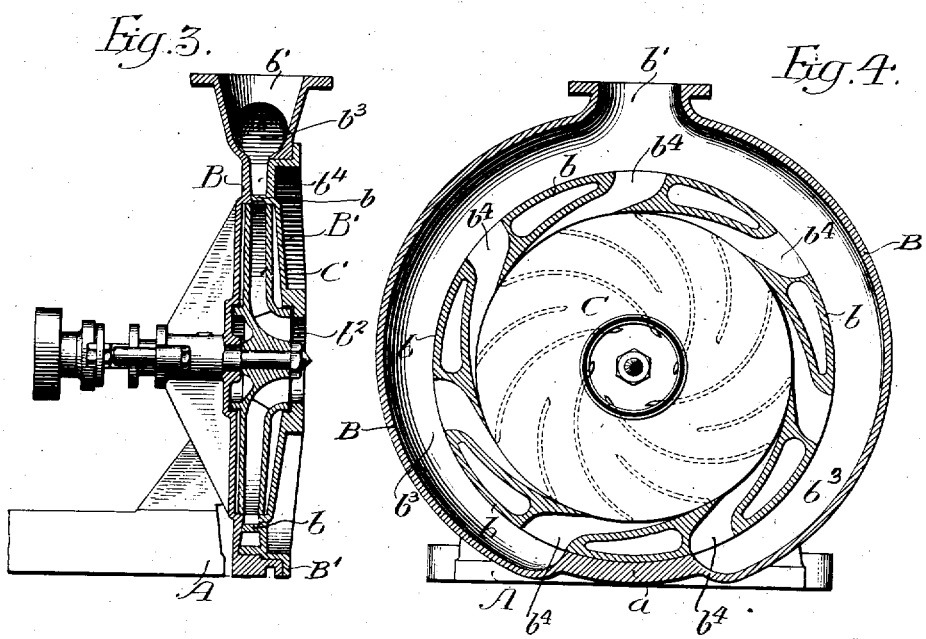
Witnesses:
John J. Kittle
A. Newcomb
Inventor
Harry A. Prindle,
By his Attorneys
Prindle and Williamson

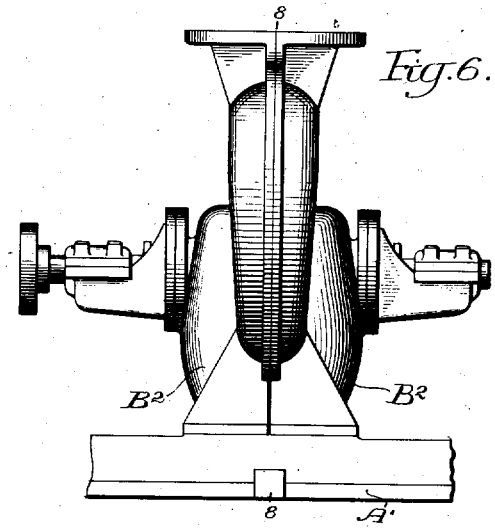
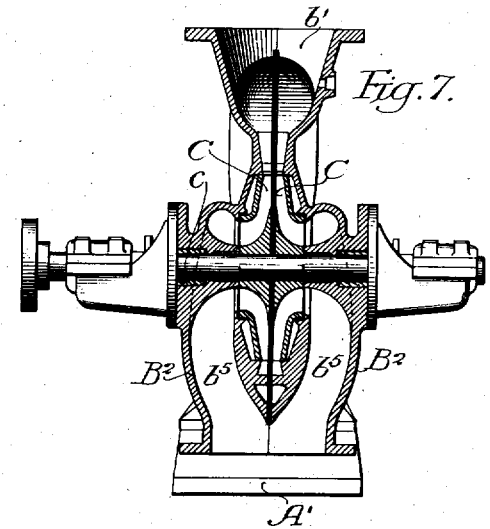
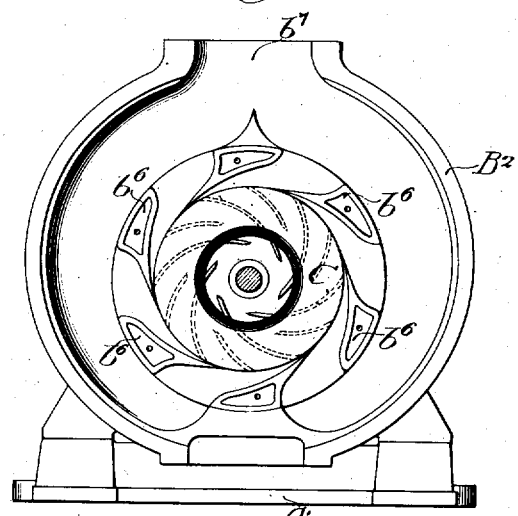
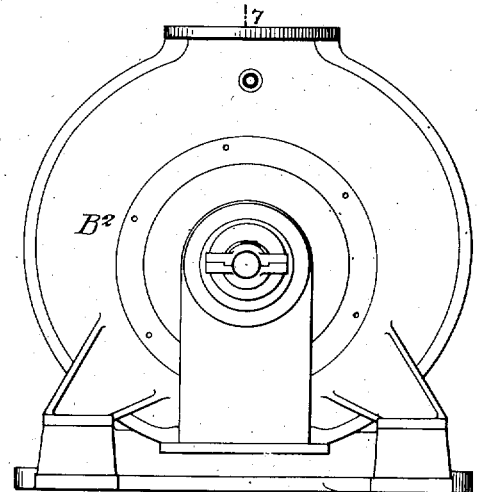
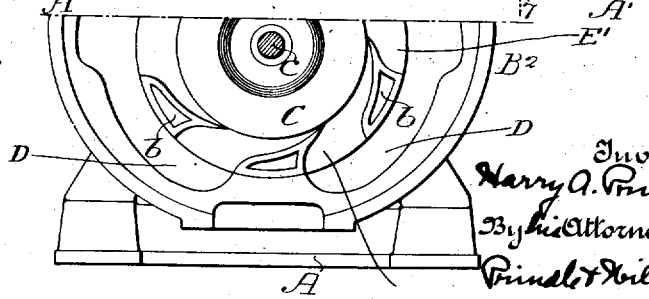

H. A. PRINDLE.
CENTRIFUGAL PUMP.
APPLICATION FILED AUG. 6, 1907.

958,765.

Patented May 24, 1910.

5 SHEETS—SHEET 3.

Witnesses:
John J. Kittle
A. Newcomb

Inventor
Harry A. Prindle,
By his Attorneys:
Prindle and Williamson,

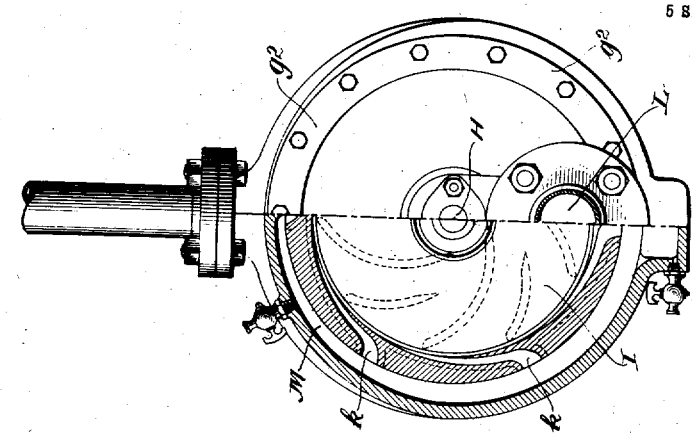
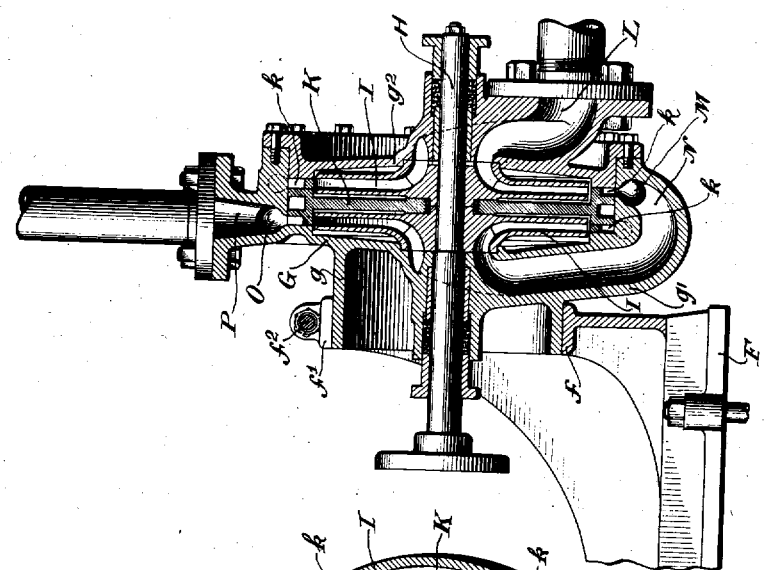
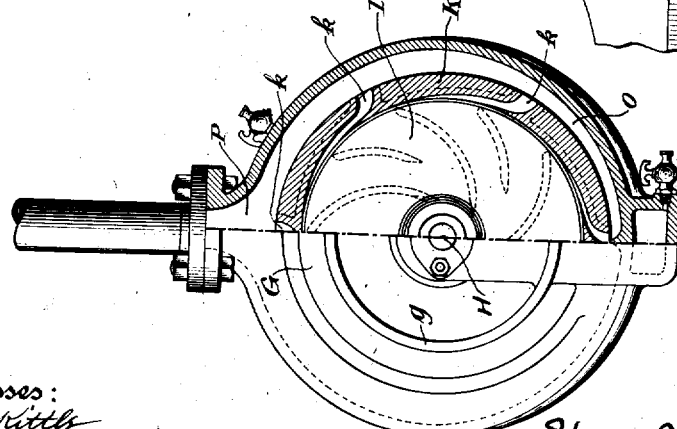

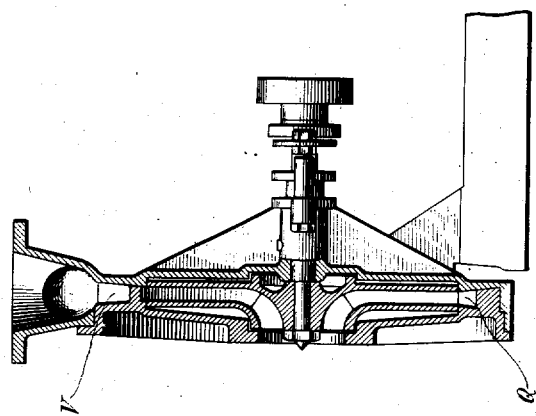
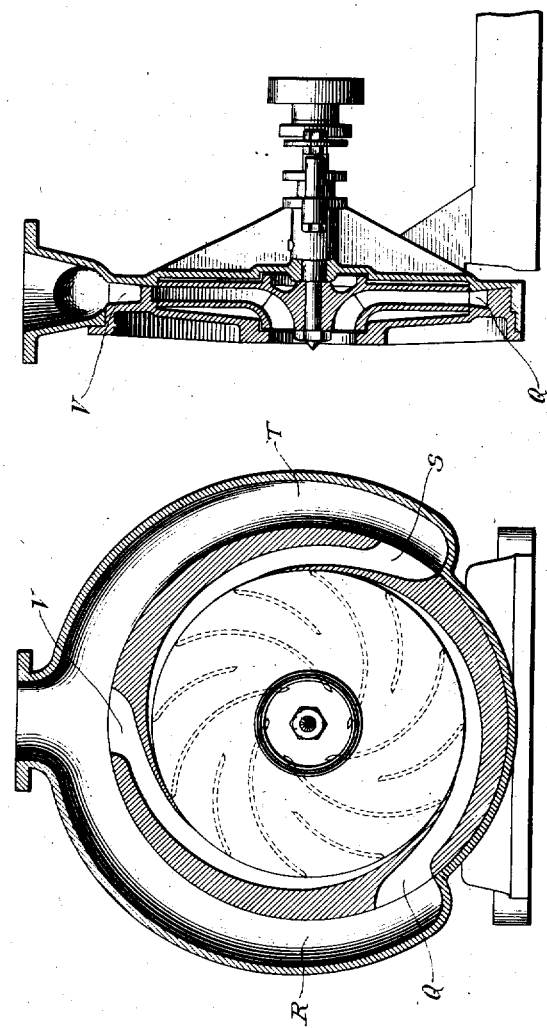

UNITED STATES PATENT OFFICE.

HARRY A. PRINDLE, OF PHILADELPHIA, PENNSYLVANIA.

CENTRIFUGAL PUMP.

958,765.  Specification of Letters Patent. Patented May 24, 1910.

Application filed August 6, 1907. Serial No. 387,331.

*To all whom it may concern:*

Be it known that I, HARRY A. PRINDLE, of Philadelphia, in the county of Philadelphia and in the State of Pennsylvania, have invented a certain new and useful Improvement in Centrifugal Pumps, and do hereby declare that the following is a full, clear, and exact description thereof, reference being had to the accompanying drawings, in which—

Figure 9:
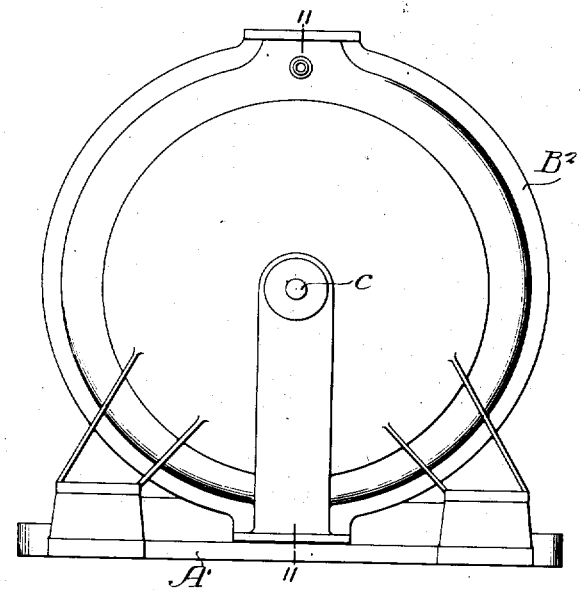
Figure 10:
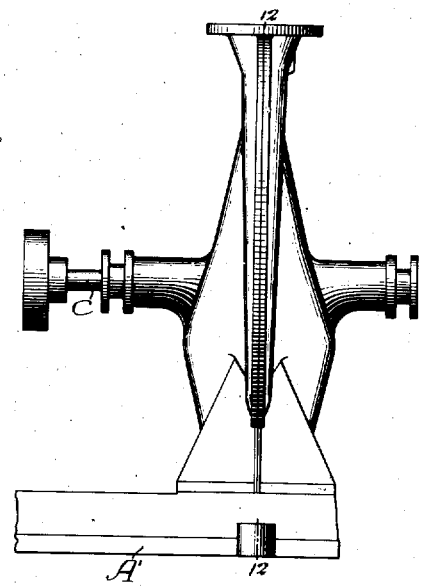
Figure 12:
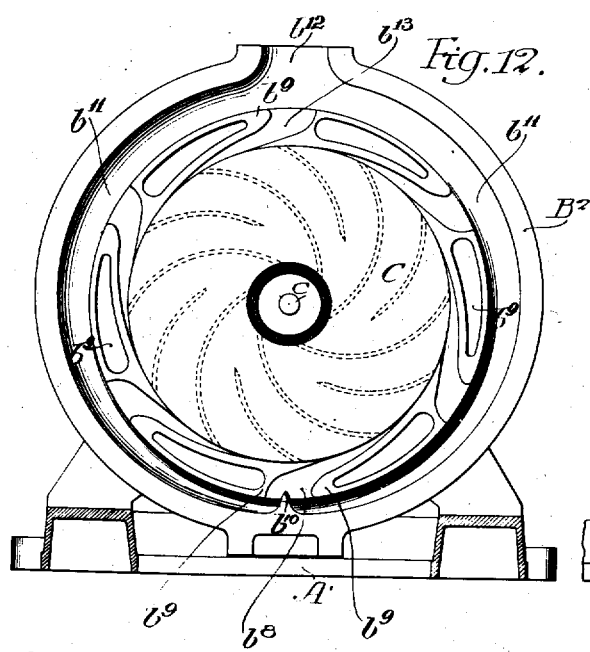
Figure 11:
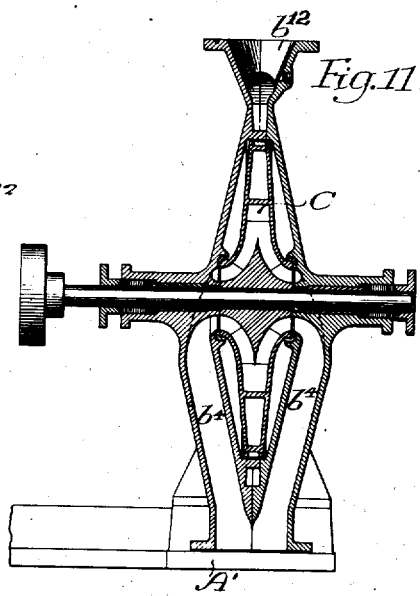

Figures 1 and 2 are respectively a side and an end elevation of a pump embodying my invention. Fig. 3 is a section on the line 3—3 Fig. 1. Fig. 4 is a section on the line 4—4 Fig. 2. Figs. 5 and 6 are respectively end and side elevations of another embodiment of my invention. Fig. 7 is a section on the line 7—7 Fig. 5. Fig. 8 is a section on the line 8—8 Fig. 6. Figs. 9 and 10 are respectively a side elevation and an end elevation of another embodiment of my invention. Fig. 11 is a section on the line 11—11 Fig. 9. Fig. 12 is a section on the line 12—12 Fig. 10. Fig. 13 is a side elevation of the lower portion of half a pump, constituting another embodiment of my invention, Figs. 14, 15 and 16 are respectively a central longitudinal view and opposite end elevations, partly in section, of another embodiment of my invention, and Figs. 17 and 18 are respectively a vertical longitudinal sectional view, and a vertical transverse sectional view of another embodiment of my invention.

The object of my invention has been to provide a centrifugal pump that shall have among others the advantage of having water passages for conveying water from the runners, so constructed that they shall result in a minimum loss of energy, the water being conducted by a direct route, and in passages so proportioned that the pressure and velocity of the water shall be maintained substantially uniform, and to such ends my invention consists in the centrifugal pump hereinafter specified.

My invention can be embodied in many different forms. That form of my invention which is illustrated in Figs. 1 to 4 inclusive has a base A that supports one section B of the pump casing, the section being preferably cast integral with the base. The casing is completed by another section B′, the sections forming between them a chamber for the runner C, the said runner being mounted upon a shaft in the usual manner and therefore not necessary to be described. The runner consists of the usual side-plates connected by spiral blades or vanes. The entrance for the water in this instance is through the opening $b^2$ in the casing section B′, which opening is concentric with the shaft. The water after passing through the runner passes through diffusing passages formed between diffusion vanes $b$ into a discharge chamber or passage $b^3$ with which said passages communicate. It is in the form of the discharge passage $b^3$ and its resultant advantages that my invention chiefly lies. The passage $b^3$ consists, in the present instance, of two branches beginning in the lower part of the pump in line with the mouths of the diffusing nozzles or passages $b^4$, the space between the said branches being filled in by a part $a$ of the casing. These branches of the discharge passage gradually and smoothly turn the water gradually and smoothly away from the central plane of the pump, and convey it toward the discharge outlet $b′$. The branches of the discharge passage $b′$ gradually increase in area as they pass successive discharge nozzles to accommodate the increasing volume of water so as preferably neither to increase nor decrease either the pressure or velocity of the water as it is received from the discharge nozzles; but in any event, every cross-section is so chosen that there will be no unintentional increase or decrease of pressure or velocity.

In the operation of the present form of my invention, the water enters the inlet $b^2$, and through the action of the buckets or ribs of the runner is given a strong outward impetus. It leaves the runner substantially tangent to the diffusion vanes $b$, and passing through the discharge nozzles between such vanes enters one or the other branch $b^3$ of the discharge passage, where it is turned by the most direct route to the outlet $b′$. By this means the water is always under control, and flows in direct and certain lines, and expends no substantial part of its energy in the formation of eddies. This is not true of former pumps where the discharge outlet forms one annular chamber entirely surrounding the diffusion vanes. In the case of such form of pumps, some of the water passes up one side of the casing to the outlet, and the rest of the water up the other side, which necessarily means that there must be a point between where the water is uncertain which way to go, and is expending its energy in the formation of eddies.

With my discharge passage, which may be termed a "twin volute" passage, the waterway gradually increases in area to accommodate additional streams of water issuing from successive diffusing nozzles, so that the pressure and velocity are maintained as desired, thereby avoiding fluctuations which would otherwise impair the efficiency by the formation of eddies. My twin volute also results in a decrease of the size of the pump since there is no waste space, but just area sufficient to properly conduct the discharging water. This results in a reduction of the surface exposed to friction and a further gain in efficiency.

My construction of pump lowers the center of gravity as compared with the old construction, which reduces vibration, and size, weight and cost of the pump.

In that embodiment of my invention illustrated in Figs. 5 to 8 inclusive, the construction is substantially the same, except that the pump is balanced by causing the water to enter a double runner from both sides. The base A' supports casing sections $B^2$, which are duplicates of each other. The water enters from below and is divided into passages $b^5$, from which it enters the double suction runner C from opposite sides, the water leaving the runner between diffusing vanes $b^6$, and arriving at the outlet $b^7$ through twin volute discharge passages as before described.

In the form of my invention which is illustrated in Figs. 9 to 12 inclusive, the construction is substantially the same as that in Figs. 5 to 8, except that there is a diffusing nozzle $b^8$ between the diffusion vanes $b^9$ at a central point at the bottom of the pump, and the water from this single nozzle is divided by a diverter blade or lip $b^{10}$ so that it flows each way into the twin volute discharge passages $b^{11}$ to the exit $b^{12}$. A diffusing nozzle $b^{13}$ is formed directly under the exit $b^{12}$ so that it, by an injector-like action, tends to suck or cause the water to flow into the outlet from the two branches of the waterway.

In the form of my invention which is illustrated in Fig. 13, the construction is substantially the same as in Figs. 1 to 4, except that the branches D of the twin volute discharge are substantially uniform in cross-section from one diffusing nozzle E to the next diffusing nozzle $E'$ instead of being of constantly increasing cross-section.

In the form of my invention which is illustrated in Figs. 14 to 16, a double stage pump is shown. The pump consists of a base F supporting one casing section G by a cylindrical boss or hub $g$ that is inserted in a split ring $f$ carried by the base F, the branches $f'$ of the split ring being drawn together around the hub by a tension bolt $f^2$. The case G consists of a chambered section $g'$, closed by a head $g^2$, the shaft H having bearings in such two parts. The shaft carries similar but reversed runners I, and there is a partition K that is interposed between the two casing sections, and that divides it into two runner chambers. Diffusing nozzles $k$ are formed, preferably in the partition K, one set of diffusing nozzles for each runner. The water enters through an inlet L offset from the center of the casing and formed in the casing section $g^2$, and passes through the first runner and thence through its diffusing nozzles into a twin volute passage M, as shown in Fig. 16; the branches of such passage unite and convey the water to a passage N whence it is conveyed to the central inlet of the second runner. The water passes through the second runner, and through its diffusing nozzles $k$, and enters the branches of the second twin volute O, by which means it reaches the outlet P. As all the diffusing vanes and passages in this form of my invention are in the partition K, and as this partition is circular, the direction of rotation of the pump can be reversed by reversing the partition K and the runners in the casing. This form of my pump is balanced so that there is no end thrust to the shaft.

It is obvious that my invention can be embodied in other forms than those I have illustrated, and I desire that my claims shall not be limited to the specific constructions by which I have chosen to illustrate the invention. For instance, I can, as illustrated in Fig. 17, provide only three diffusing passages, the lower one Q reaching the outlet by a chamber R, which only carries the flow from such nozzle or passage. The right hand diffusing nozzle or passage S reaching the outlet through its chamber or passage T, which only carries the water from the passage S, and the third or upper diffusing nozzle or passage V opening directly toward the outlet.

I claim—

1. A pump having a casing provided with an inlet, a runner in said casing, an outlet substantially in the plane of the runner and at one side of the runner, and a discharge chamber for conveying water from said runner to said outlet, said discharge chamber having two separated branches extending from a point substantially on the opposite side of the periphery of said runner from said outlet, around said runner to said outlet.

2. A pump having a casing provided with an inlet, a runner in said casing, an outlet substantially in the plane of the runner, and a discharge chamber for conveying water from said runner to said outlet, said discharge chamber having two separated branches extending from a point removed from said outlet to said outlet.

3. A pump having a casing provided with an inlet, a runner in said casing, an outlet substantially in the plane of the runner, a discharge chamber for conveying water from said runner to said outlet, said discharge chamber having two separated branches extending from a point removed from said outlet to said outlet, and said branches gradually increasing in cross-section in a direction toward said outlet.

4. A pump having a casing provided with an inlet, a runner in said casing, an outlet substantially in the plane of said runner, and a discharge passage for conveying water from the runner to the outlet, said discharge passage having two separated branches, beginning at a point on the opposite side of the runner from the outlet and extending to the outlet, and gradually increasing in cross-section.

5. A pump having a casing provided with an inlet, a runner in the casing, diffusion vanes around the runner, and a discharge chamber for receiving the water from said vanes and conveying it to an outlet, said discharge chamber being formed in two separated branches of increasing area of cross-section as they approach the outlet.

6. The combination of a pump casing, having an inlet and a discharge chamber, a shaft mounted in said casing, similar but reversed runners on said shaft, a reversible plate mounted in said casing between said runners, guide-vanes on opposite sides of said plate, one set of vanes directing water from the first runner to the second, and another set of vanes directing the water from the second runner to the outlet, whereby said plate can be reversed and the direction of rotation reversed.

7. The combination of a pump casing, having an inlet and a discharge chamber, a shaft mounted in said casing, similar but reversely placed runners on said shaft, a reversible plate between said runners, vanes on said plate forming diffusion nozzles for conveying water from said first impeller to said discharge chamber, said vanes forming two separated passages, beginning on the opposite side of the impeller from the discharge chamber, and increasing in area as they extend toward the discharge chamber, said discharge chamber communicating with the inlet of the second impeller, vanes formed on the opposite side of said plate, forming two separated passages communicating with the outlet, said passages beginning on the opposite side of said second impeller from said outlet and increasing in area as they extend toward said outlet.

8. In a centrifugal pump, the combination of a casing, a shaft mounted therein, reversely placed runners mounted on said shaft, an inlet communicating with the first runner, discharge passages for said runner, consisting of two separated passages increasing in area from the point of separation toward the discharge to the second impeller, and two separated discharge passages for the second impeller, said last-mentioned discharge passages having their point of separation substantially diametrically opposite from the point of separation of the similar passages for the first impeller, said passages for the second impeller increasing in area in the direction toward the outlet.

9. A pump having a casing provided with an inlet, a runner in said casing, an outlet substantially in the plane of the runner, a discharge chamber having two separated branches, beginning on the opposite side of the runner from the outlet and extending to the outlet, said branches increasing in area in a direction toward the outlet, diffusing nozzles connecting the runner chamber with the discharge chamber, one of said nozzles being arranged in line with the point of separation between said two branches of the water way to divide the water discharged by it between the two branches of the waterway.

10. A pump consisting of a casing, having a plurality of runners in said casing, passages for conveying water to the inlets of said runners from opposite sides, whereby to balance the pump, and discharge chambers having two separated branches each that respectively surround said runners, and said branches having gradually increasing cross-section in a direction toward their respective outlets, at which they meet.

11. A pump consisting of a casing, having two runners therein, an inlet to supply water to one of said runners, a discharge chamber for such runner consisting of two separated branches of gradually increasing cross-section toward a point where they meet, an inlet passage for the second runner connected with said discharge passage of the first runner, and a discharge passage for the second runner consisting of two separated branches surrounding the runner, and of gradually increasing cross-section in a direction toward the point where they meet.

12. A centrifugal pump consisting of the combination of a runner, a casing having a water discharge chamber surrounding the tion of a casing, a plurality of runners and a division wall on the opposite side of the runner from said outlet extending substantially to the periphery of the runner.

13. In a centrifugal pump, the combination of a casing, a plurality of runners and a removable symmetrical part having formed within it diffusing vanes and passages whereby the direction of rotation can be reversed by reversing the runners and said symmetrical part.

In testimony that I claim the foregoing I have hereunto set my hand.

HARRY A. PRINDLE.

Witnesses:
EDWIN J. PRINDLE,
ANNA NEWCOMB.

---

Correction in Letters Patent No. 958,765.

It is hereby certified that in Letters Patent No. 958,765, granted May 24, 1910, upon the application of Harry A. Prindle, of Philadelphia, Pennsylvania, for an improvement in "Centrifugal Pumps," an error appears in the printed specification requiring correction as follows: Page 4, line 4, the syllable and words "tion of a casing, a plurality of runners" should be stricken out and the words *runner, an outlet from said chamber*, be inserted instead; and that the said Letters Patent should be read with this correction therein that the same may conform to the record of the case in the Patent Office.

Signed and sealed this 13th day of June, A. D. 1911.

[SEAL.]

C. C. BILLINGS,
*Acting Commissioner of Patents.*

12. A centrifugal pump consisting of the combination of a runner, a casing having a water discharge chamber surrounding the tion of a casing, a plurality of runners and a division wall on the opposite side of the runner from said outlet extending substantially to the periphery of the runner.

13. In a centrifugal pump, the combination of a casing, a plurality of runners and a removable symmetrical part having formed within it diffusing vanes and passages whereby the direction of rotation can be reversed by reversing the runners and said symmetrical part.

In testimony that I claim the foregoing I have hereunto set my hand.

HARRY A. PRINDLE.

Witnesses:
EDWIN J. PRINDLE,
ANNA NEWCOMB.

---

Correction in Letters Patent No. 958,765.

It is hereby certified that in Letters Patent No. 958,765, granted May 24, 1910, upon the application of Harry A. Prindle, of Philadelphia, Pennsylvania, for an improvement in "Centrifugal Pumps," an error appears in the printed specification requiring correction as follows: Page 4, line 4, the syllable and words "tion of a casing, a plurality of runners" should be stricken out and the words *runner, an outlet from said chamber*, be inserted instead; and that the said Letters Patent should be read with this correction therein that the same may conform to the record of the case in the Patent Office.

Signed and sealed this 13th day of June, A. D. 1911.

[SEAL.]

C. C. BILLINGS,
*Acting Commissioner of Patents.*

Correction in Letters Patent No. 958,765.

It is hereby certified that in Letters Patent No. 958,765, granted May 24, 1910, upon the application of Harry A. Prindle, of Philadelphia, Pennsylvania, for an improvement in "Centrifugal Pumps," an error appears in the printed specification requiring correction as follows: Page 4, line 4, the syllable and words "tion of a casing, a plurality of runners" should be stricken out and the words *runner, an outlet from said chamber*, be inserted instead; and that the said Letters Patent should be read with this correction therein that the same may conform to the record of the case in the Patent Office.

Signed and sealed this 13th day of June, A. D. 1911.

[SEAL.]

C. C. BILLINGS,
*Acting Commissioner of Patents.*